(12) United States Patent  
Schlemmer et al.

(10) Patent No.: US 8,560,521 B2  
(45) Date of Patent: Oct. 15, 2013

(54) SYSTEM, METHOD, AND COMPUTER PROGRAM PRODUCT FOR PROCESSING A PREFIX TREE FILE UTILIZING A SELECTED AGENT

(75) Inventors: Andreas Schlemmer, Wilhering (AT); Thomas C. H. Steiner, Linz (AT); Peter Blaimschein, Seitenstetten (AT)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/150,947

(22) Filed: Jun. 16, 2011

(65) Prior Publication Data

US 2011/0246531 A1 Oct. 6, 2011

Related U.S. Application Data

(63) Continuation of application No. 11/963,589, filed on Dec. 21, 2007, now Pat. No. 7,979,418.

(51) Int. Cl.
*G06F 7/00* (2006.01)
*G06F 17/30* (2006.01)

(52) U.S. Cl.
USPC ......................................................... 707/709

(58) Field of Classification Search
USPC .................... 707/200, 709, 797, 801
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,094,706 A * | 7/2000 | Factor et al. | 711/113 |
| 6,460,050 B1 | 10/2002 | Pace et al. | |
| 7,080,073 B1 * | 7/2006 | Jiang et al. | 1/1 |
| 7,506,155 B1 | 3/2009 | Stewart et al. | |
| 7,861,304 B1 * | 12/2010 | Nachenberg et al. | 726/24 |
| 2001/0018697 A1 * | 8/2001 | Kunitake et al. | 707/517 |
| 2002/0010798 A1 * | 1/2002 | Ben-Shaul et al. | 709/247 |
| 2002/0029304 A1 * | 3/2002 | Reynar et al. | 709/332 |
| 2005/0091588 A1 * | 4/2005 | Ramarao et al. | 715/522 |
| 2005/0182752 A1 * | 8/2005 | Rojer | 707/2 |
| 2005/0192966 A1 * | 9/2005 | Hilbert et al. | 707/10 |
| 2005/0203957 A1 * | 9/2005 | Wang et al. | 707/104.1 |
| 2005/0256894 A1 * | 11/2005 | Talanis et al. | 707/102 |
| 2006/0047498 A1 * | 3/2006 | Fux et al. | 704/3 |
| 2006/0053097 A1 * | 3/2006 | King et al. | 707/3 |
| 2006/0101514 A1 * | 5/2006 | Milener et al. | 726/22 |
| 2006/0161546 A1 * | 7/2006 | Callaghan et al. | 707/7 |
| 2007/0208703 A1 * | 9/2007 | Shi et al. | 707/3 |
| 2007/0282951 A1 * | 12/2007 | Selimis et al. | 709/205 |
| 2008/0033998 A1 * | 2/2008 | Rao et al. | 707/104.1 |
| 2008/0114765 A1 * | 5/2008 | Asai et al. | 707/7 |
| 2008/0262991 A1 * | 10/2008 | Kapoor et al. | 706/20 |
| 2008/0281788 A1 * | 11/2008 | Frieder et al. | 707/3 |
| 2008/0306949 A1 * | 12/2008 | Hoernkvist et al. | 707/7 |
| 2009/0063538 A1 * | 3/2009 | Chitrapura et al. | 707/102 |
| 2009/0089278 A1 * | 4/2009 | Poola et al. | 707/5 |
| 2009/0319518 A1 * | 12/2009 | Koudas et al. | 707/5 |

OTHER PUBLICATIONS

"Trie," Wikipedia, last modified Dec. 1, 2007, http://en.wikipedia.org/wiki/Trie.

* cited by examiner

*Primary Examiner* — Robert Beausoliel, Jr.
*Assistant Examiner* — Nicholas Allen
(74) *Attorney, Agent, or Firm* — Patent Capital Group

(57) ABSTRACT

A system, method, and computer program product are provided for processing a prefix tree file utilizing a selected agent. In use, a file including a prefix tree is identified. Additionally, an agent is selected from a plurality of agents to process the file. Further, the file is processed utilizing the agent.

20 Claims, 8 Drawing Sheets

SYSTEM, METHOD, AND COMPUTER PROGRAM PRODUCT FOR PROCESSING A PREFIX TREE FILE UTILIZING A SELECTED AGENT

RELATED APPLICATION

This application is a continuation (and claims the benefit of priority under 35 U.S.C. §120) of U.S. application Ser. No. 11/963,589, filed Dec. 21, 2007 now U.S. Pat. No. 7,979,418, entitled "SYSTEM, METHOD, AND COMPUTER PROGRAM PRODUCT FOR PROCESSING A PREFIX TREE FILE UTILIZING A SELECTED AGENT," Inventor(s) Andreas Schlemmer, et al. The disclosure of the prior application is considered part of (and is incorporated by reference in) the disclosure of this application.

FIELD OF THE INVENTION

The present invention relates to prefix trees, and more particularly storing data in prefix trees.

BACKGROUND

Traditionally, data has been stored in relational databases for providing access to such data. However, use of relational databases for hierarchical data has exhibited various limitations. Particularly, relational databases have been limited with respect to storing and accessing very large amounts of data.

For example, traditional relational databases have limited ability to scale to large amounts of data. In addition, traditional relational databases oftentimes require costly redundant arrays of independent disks (RAID) devices to exhibit adequate query performance. Further, transforming hierarchical data into traditional relational databases has also been limited in performance.

Still yet, queries for retrieving data for web crawling purposes, storing data, modifying data, etc. have conventionally been unable to be a part of a distributed system. For example, selecting data from a traditional relational database usually results in a high number of cross-table joins and constraints to be processed in order to define crawling behavior and to impose limitations on the amount of data to be stored. Examples for such constraints include prevention of target server flooding by keeping an amount of parallel requests low, internet protocol (IP) address information tracking to avoid parallel visits of target servers on multiple crawler nodes through usage of mutually exclusive IP ranges, as well as focused selections of hyperlinks to follow via user-definable strategies (e.g. only follow links that could point to potentially interesting content).

There is thus a need for overcoming these and/or other issues associated with the prior art.

SUMMARY

A system, method, and computer program product are provided for processing a prefix tree file utilizing a selected agent. In use, a file including a prefix tree is identified. Additionally, an agent is selected from a plurality of agents to process the file. Further, the file is processed utilizing the agent.

DETAILED DESCRIPTION

Figure 1:
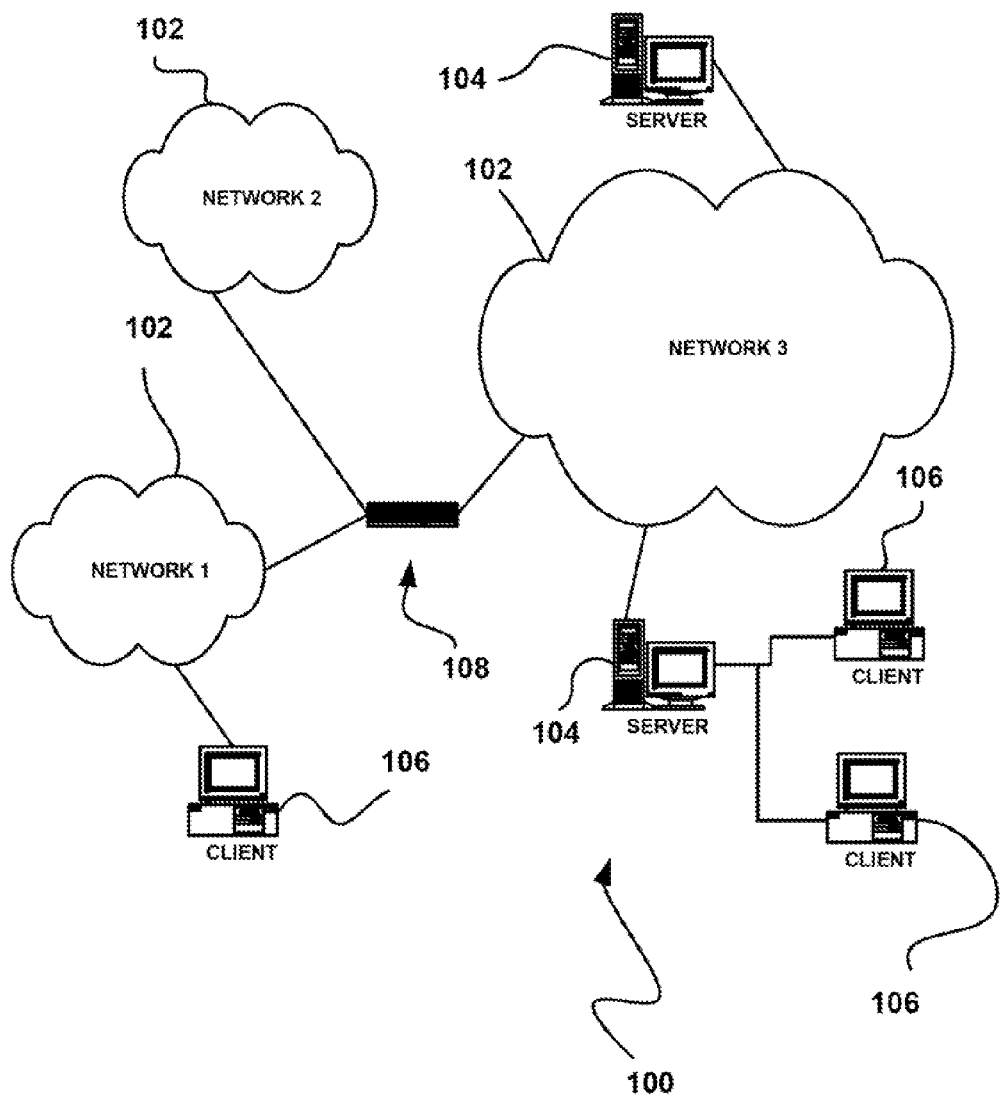
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
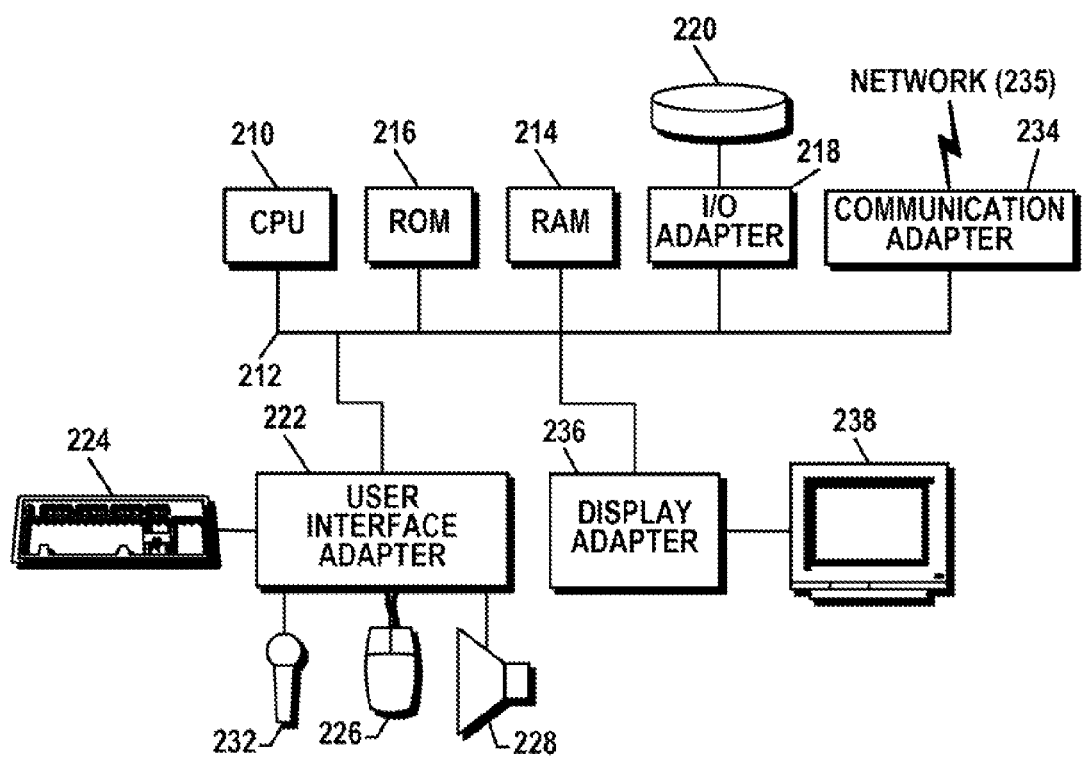
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
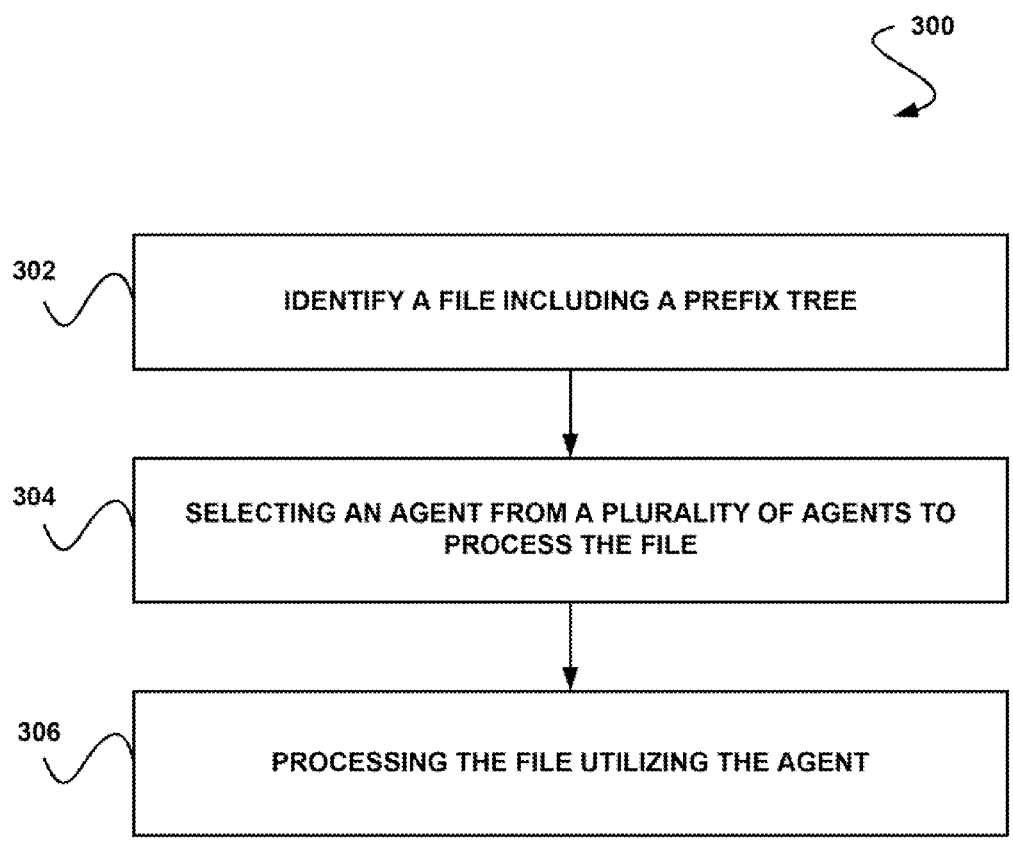
FIG. 3 shows a method for processing a prefix tree file utilizing a selected agent, in accordance with one embodiment.

FIG. 3 shows a method 300 for processing a prefix tree file utilizing a selected agent, in accordance with one embodiment. As an option, the method 300 may be carried out in the context of the architecture and environment of FIGS. 1 and/or 2. Of course, however, the method 300 may be carried out in any desired environment.

As shown in operation 302, a file including a prefix tree is identified. In the context of the present description, the prefix tree may include any ordered hierarchical data structure which stores arrays of data with a common prefix. For example, each of a plurality of descendants of a node may include a common prefix. In one embodiment, the prefix tree may be a trie.

In one embodiment, the prefix tree may store a plurality of uniform resource locators (URLs). As an option, each of the URLs stored in the prefix tree may include a common prefix. Just by way of example, the common prefix may include the first two characters (e.g. letters, etc.) of a domain name server (DNS) domain name of each of the URLs. Of course, it should be noted that any desired data with a common prefix (e.g. identifiers, data paths, strings, etc.) may be stored in the prefix tree.

As another option, the common prefix of URLs capable of being stored in the prefix tree may be predefined (e.g. by a user, etc.). For example, the characters representative of the common prefix may be predefined. As another example, the number of characters representative of the common prefix may also be predefined.

Additionally, the file may include any resource capable of storing the prefix tree. In one embodiment, the file may be dedicated to storing the prefix tree. Thus, the file may only store the prefix tree, as an option.

Further, the file may be identified in any desired manner. In one embodiment, the file may be identified based on a selection of the file, as set forth in the example explained below. To this end, the file may be selected from a plurality of files, each file including a different prefix tree.

For example, the file may be selected from a queue of files, where each file in the queue of files includes a different prefix tree. As another example, the file may be selected based on a time of a last access to the file. Thus, the queue of files may optionally store the files in order of a time each of the files were last accessed, where more recently accessed files are stored in the queue after less recently accessed files.

In addition as shown in operation 304, an agent is selected from a plurality of agents to process the file. In one embodiment, the agents may be running on the client computer and/or server computer on which the file is stored. In this way, the selected agent may access the file locally for processing the file.

In another embodiment, each of the agents may include software. For example, each of the agents may include a command line executable. Of course, each of the agents may include hardware with respect to another embodiment. Furthermore, a predefined number of the agents (e.g. predefined by a user, predefined based on capabilities and/or resources of the computer on which the agents are located, etc.) may optionally execute in parallel.

In yet another embodiment, each of the agents may perform different functions. Such functions may include a crawling function (e.g. for crawling sites, such as web sites, indicated by data stored in the prefix tree, etc.), a merging function (e.g. for merging data into the prefix tree, etc.), a separating function (e.g. for separating data within the prefix tree, etc.), a reorganization function (e.g. for reorganizing data stored in the prefix tree, etc.) and/or any other function capable of being performed with respect to the prefix tree and/or any information associated with such prefix tree. To this end, the agent may optionally be selected based on the type of processing to be performed on the file.

As another option, the agent may be selected based on a determination of whether the agent is in an idle state. For example, only an agent in an idle state may be selected for processing the file. As yet another option, the agent may be selected based on the type of prefix tree included in the file. Thus, an agent capable of categorizing data may be selected for processing a prefix tree containing uncategorized data, just by way of example.

Still yet, the file is processed utilizing the agent, as shown in operation 306. In the context of the present description, the processing may include performing any functions in association with the file. For example, the processing may include executing any functions capable of being performed by the agent.

In one embodiment, the processing may include downloading a web page identified using a URL stored in the prefix tree. In another embodiment, the processing may include analyzing the web page for gathering information associated with the URL. Such information may include, for example, information indicating whether the web page includes unwanted content (e.g. malware, etc.) and/or a type of any unwanted content discovered in the web page, a categorization of the web page, a type of language included in the web page, etc. In yet another embodiment, the processing may include categorizing the URL (e.g. based on a categorization of the web page, etc.).

In this way, the prefix tree file may be processed utilizing an agent selected from a plurality of agents. As an option, the identification of the file (operation 302), the selection of the agent (operation 304), and the processing of the file (operation 306) may be controlled utilizing a controller application. In one embodiment, the controller application may schedule execution of one of the agents for processing the prefix tree file. The controller application may be located on the computer on which the file and/or agents are located, for example.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
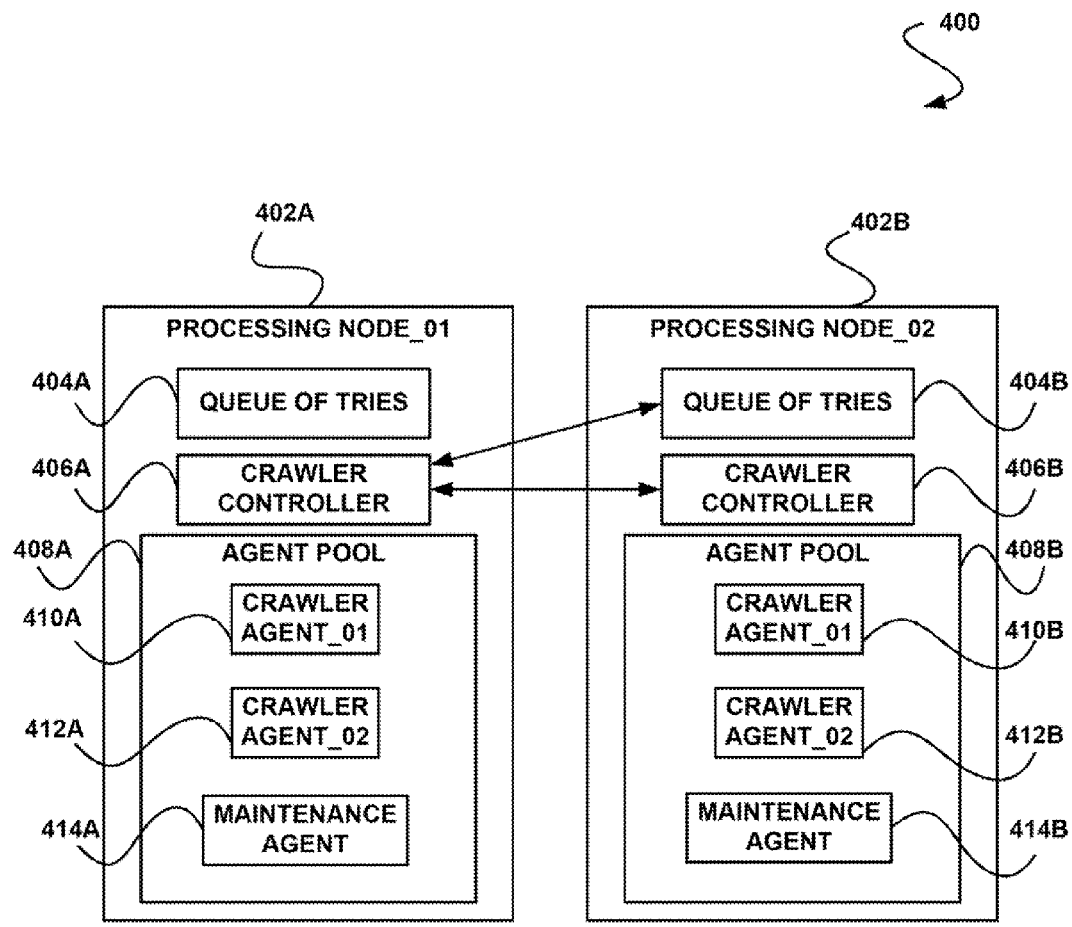
FIG. 4 shows a system for processing a prefix tree file utilizing a selected agent, in accordance with one embodiment.

FIG. 4 shows a system 400 for processing a prefix tree file utilizing a selected agent, in accordance with one embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a first processing node 402A is in communication with a second processing node 402B. In one embodiment, the first processing node 402A may communicate with the second processing node 402B over a network (e.g. such as any of the networks described above with respect to FIG. 1), but of course the first processing node 402A may also communicate with the second processing node 402B via a local connection. In another embodiment, the first processing node 402A may communicate with the second processing node 402B using a server message block (SMB) protocol, a node specific protocol and/or any other protocol capable of being used for communication purposes. The first processing node 402A and the second processing node 402B may optionally operate as a peer network of independent nodes.

In the context of the present embodiment, the first processing node 402A and the second processing node 402B may each include any of the devices described above with respect to FIGS. 1 and/or 2. For example, the first processing node 402A and the second processing node 402B may each include the Intel® Core™ 2 Duo processor with 250 gigabytes of hard disk space. Thus, the first processing node 402A and the second processing node 402B may optionally include client computers instead of being consolidated on expensive high-end servers. While only two processing nodes 402A and 402B are shown, it should be noted that any desired number of processing nodes may be included in the system 400, thus allowing scalability of the system 400.

The first processing node 402A and the second processing node 402B each include a respective queue of prefix trees 404A and 404B (hereinafter referred to as tries). The queues of tries 404A and 404B may each include a plurality of trie files, where each trie file includes a different trie (e.g. a different type of trie, etc.) that stores different data (e.g. URLs), for example. Thus, different trie files may be distributed across a plurality of processing nodes for providing distributed processing and load-balancing of such trie files, as described in more detail below.

Further, the trie files may be stored locally on a hard disk of a respective one of the first processing node 402A and the second processing node 402B. As an option, the queues of tries 404A and 404B may access trie files in an order based on a time in which the files were last accessed (e.g. modified, etc.). For example, the least recently accessed trie file may be stored first in the queue 404A and 404B, whereas the most recently accessed trie file may be stored last in the queue 404A and 404B. Accordingly, after a top trie file in the queue 404A and 404B is accessed (e.g. for processing, etc.), such trie file may be returned to the end of the queue 404A and 404B.

In one embodiment, each trie may only store data with a common prefix. For example, the data may include URLs, and the common prefix may include the first two characters of a DNS domain name of such URLs. Table 1 illustrates exemplary trie file names that may be stored in the queues 404A and 404B of the first processing node 402A and the second processing node 402B. Of course, it should be noted that such example is set forth for illustrative purposes only, and thus should not be construed as limiting in any manner.

TABLE 1

Processing Node_1

Trie_1: aa.ct-stores data with the common prefix aa
Trie_2: cx.ct-stores data with the common prefix cx
Trie_3: de.ct-stores data with the common prefix de Processing Node_2

Trie_1: ab.ct-stores data with the common prefix ab
Trie_2: mi.ct-stores data with the common prefix mi In the context of Table 1, and just by way of example, the URL msdn.microsoft.com would be stored in Trie_2 of Processing Node_2 since the first two characters of the DNS domain name (i.e. "microsoft") of such URL share the common prefix "mi". As another example, the URL www.dell.com would be stored in Trie_3 of Processing Node_1 since the first two characters of the DNS domain name (i.e. "dell") of such URL share the common prefix "de".

As an option, each trie file may be limited to a predetermined size (e.g. 100 megabytes, etc.), such that multiple tries may be capable of being loaded into random access memory (RAM). If the limit of any trie file is within a threshold amount of being exceeded, a new trie may be created and added to the queue of tries 404A and 404B in which the original trie is stored. Optionally, in the context of an original trie which stores data with a two character common prefix, the new trie may store data with a three character common prefix which includes the two character common prefix. In one embodiment, the respective tree is split into multiple files with a three character prefix.

The first processing node 402A and the second processing node 402B may also each include a crawler controller 406A and 406B. The crawler controller 406A and 406B may include a controller application, in one embodiment. In another embodiment, the crawler controller 406A and 406B may select the top trie file from a respective queue of tries 404A and 404B and may send the selected trie file to one of a plurality of different types of agents 410A, 410B, 412A, 412B, 414A, and 414B located in an agent pool 408A and 408B on the same processing node 402A and 402B. The agent 410A, 410B, 412A, 412B, 414A, and 414B to which the selected trie file is sent may be selected by the crawler controller 406A and 406B.

As shown, the agent pool 408A and 408B may include a first crawler agent 410A and 410B, a second crawler agent 412A and 412B, and a maintenance agent 414A and 414B. The first crawler agent 410A and 410B and/or second crawler agent 412A and 412B may each categorize data stored in trie files stored in the trie file queue 404A and 404B, download content (e.g. web pages, etc.) identified by the data stored in the trie files, analyze such content (e.g. for malware, etc.) and/or gather any other information associated with the data stored in the files. New data will be stored in an extra the file (seed trie). The maintenance agent 414A and 414B may sort data stored in such trie files that do not have a common prefix (e.g. determine a common prefix of the data), separate such data from such trie files, and optionally merge the data into various other trie files based on a common prefix between the other the files and the data.

Thus, just by way of example, the crawler controller 406A of the first processing node 402A may select a trie file from the top of the queue of tries 404A stored on the first processing node 402A. The crawler controller 406A may determine the type of the selected the file for determining which processing is to be performed on the file. Just by way of example, a trie file storing data without a common prefix may optionally require processing for separating the data and storing the data by common prefix.

Thus, the crawler controller 406A may select an agent 410A, 412A and 414A from the agent pool 408A of the first processing node 402A based on the type of the selected trie file. In the context of the above example where the trie file includes data without a common prefix may, the crawler controller 406A may select the maintenance agent 414A for sorting and merging the data into other the files with prefixes common to the data. As another option, the crawler controller 406A may select an agent 410A, 412A and 414A based on which agent 410A, 412A and 414A is idle.

As described above, the crawler controller 406A of the first processing node 402A is in communication with the second processing node 402B. Similarly, the crawler controller 406B of the second processing node 402B may also be in communication with the first processing node 402A. In one embodiment, the crawler controller 406A may control the copying of data (e.g. via a file share) stored in trie files of the first processing node 402A to a trie file in the queue of tries 404B stored on the second processing node 402B (e.g. utilizing an SMB protocol, etc.). In this way, the crawler controller 406B of the second processing node 402B may control a merging of the received data into trie files based on an associated common prefix of the data. In another embodiment, the crawler controller 406A of the first processing node 402A may be synchronized with the crawler controller 406B of the second processing node 402B via the node specific protocol.

Figure 5:
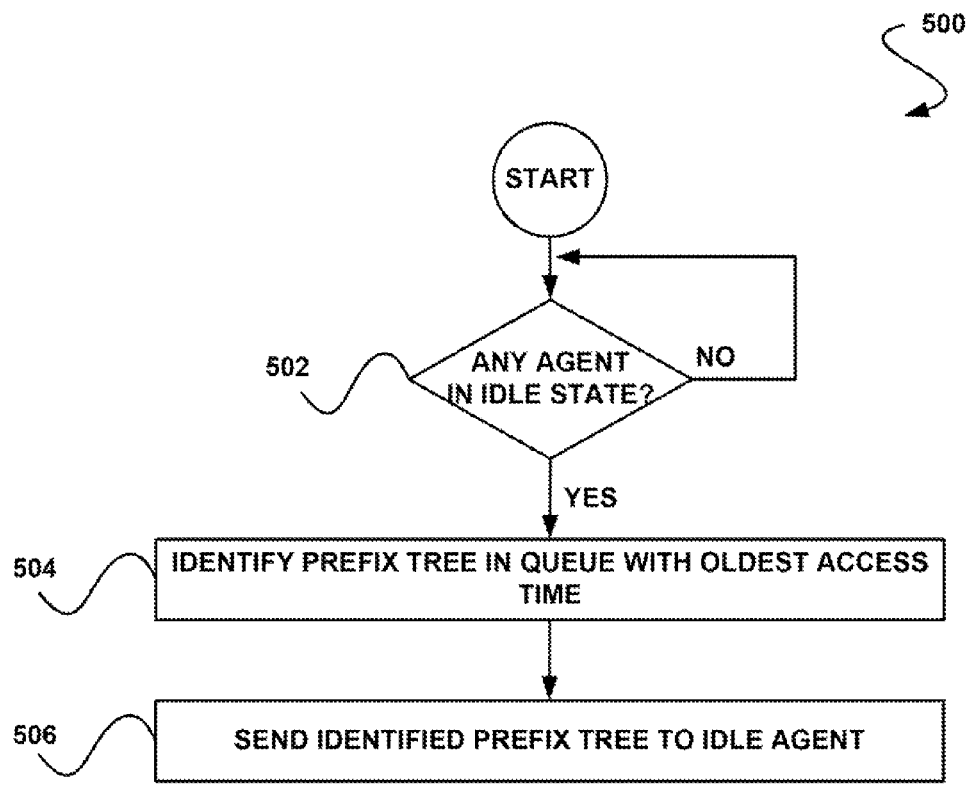
FIG. 5 shows a method for selecting an agent from a plurality of agents for processing a prefix tree file, in accordance with yet another embodiment.

FIG. 5 shows a method 500 for selecting an agent from a plurality of agents for processing a prefix tree file, in accordance with yet another embodiment. As an option, the method 500 may be carried out in the context of the architecture and environment of FIGS. 1-4. For example, the method 500 may be carried out utilizing the crawler controller 406A and 406B of FIG. 4. Of course, however, the method 500 may be carried out in any desired environment. Again, it should be noted that the aforementioned definitions may apply during the present description.

As shown in decision 502, it is determined whether any agent is in an idle state. In the context of the present embodiment, the idle state may include any state in which an agent is not being utilized (e.g. executed for processing purposes, etc.). For example, each of a plurality of agents within a pool of agents may be monitored for determining whether any of such agents are idle. As another example, each of the plurality of agents may broadcast a signal indicating an associated state, such that an agent with an idle state may be determined based on a signal broadcasted therefrom.

In response to a determination that an agent is idle, a prefix tree stored in a queue with an oldest access time is identified. Note operation 504. In one embodiment, the prefix tree may be included in a file stored in the queue. In another embodiment, the prefix tree with the oldest access time may be identified based on an ordering of prefix trees within the queue. Just by way of example, the queue may store prefix trees in an order based on a latest access time for each prefix tree. Thus, a prefix tree at a top of the queue may be the prefix tree with the oldest access time.

Further, the identified prefix tree is sent to the idle agent, as shown in operation 506. In this way, the agent may be selected for processing the prefix tree. Optionally, the prefix tree may only be sent to an agent capable of processing the type of the prefix tree. The type of the prefix tree may be indicated by the file extension of the file in which the prefix tree is included, in one embodiment. Just by way of example, if the prefix tree includes an uncategorized prefix tree, the prefix tree may only be sent to an agent capable of categorizing data within the prefix tree. Thus, the method 500 may wait to identify an idle agent capable of processing the prefix tree prior to sending the prefix tree.

Figure 6:
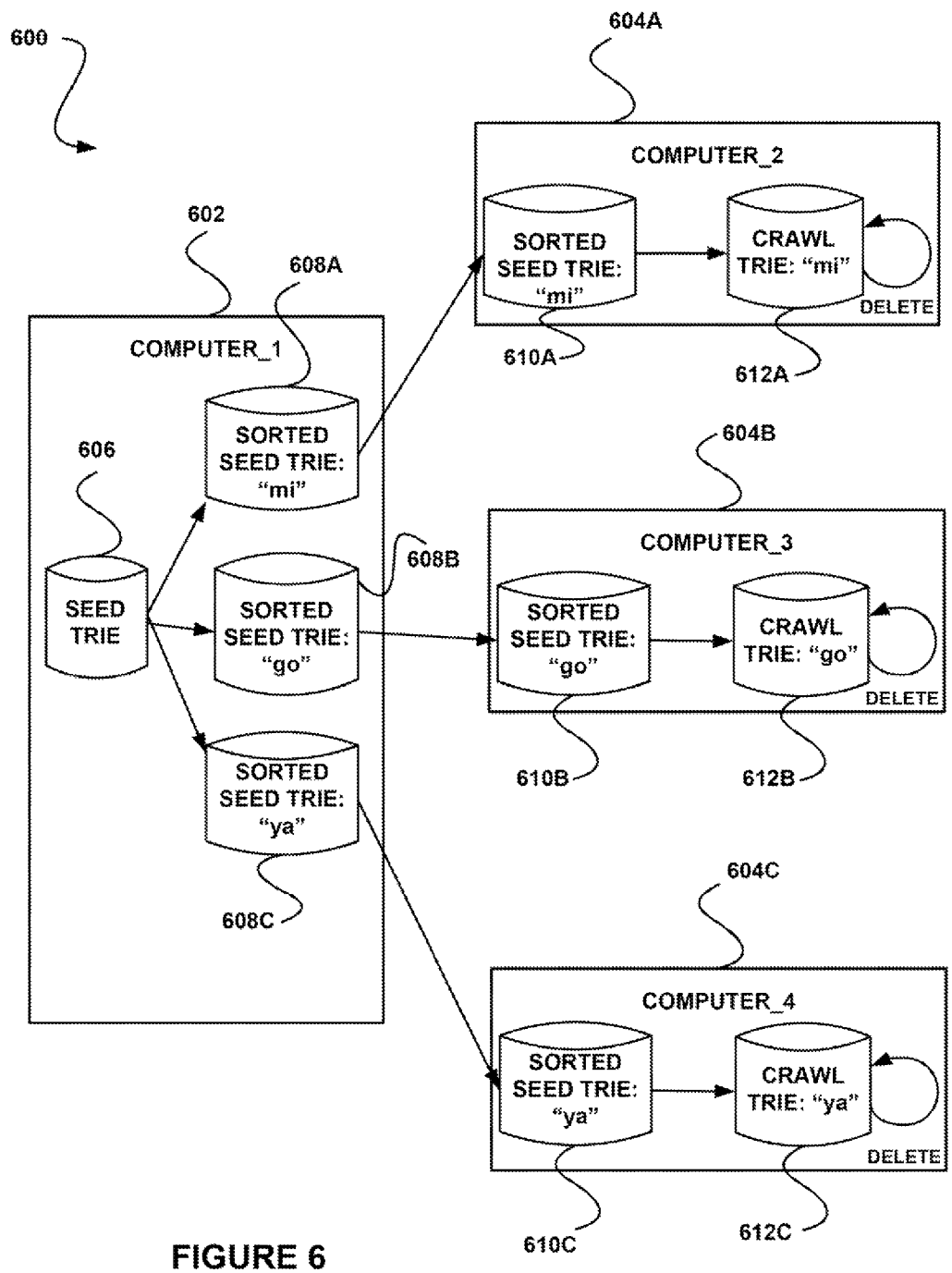
FIG. 6 shows a system for storing new data in a plurality of distributed prefix trees, in accordance with still yet another embodiment.

FIG. 6 shows a system 600 for storing new data in a plurality of distributed prefix trees, in accordance with still yet another embodiment. As an option, the system 600 may be implemented in the context of the architecture and environment of FIGS. 1-5. Of course, however, the system 600 may be implemented in any desired environment. Yet again, it should be noted that the aforementioned definitions may apply during the present description.

As shown, a first computer 602 is in communication with a second computer 604A, a third computer 604B, and a fourth computer 604C. The first computer 602, second computer 604A, third computer 604B, and fourth computer 604C may each include a processing node (e.g. such as one of the processing nodes 402A and 402B of FIG. 4), for example. Moreover, the first computer 602 may be in communication with the second computer 604A, third computer 604B, and fourth computer 604C over a network. While not shown, it should be noted that any of the second computer 604A, third computer 604B, and fourth computer 604C may also be in communication with one another.

The first computer 602 includes a seed trie 606. In one embodiment, the seed trie may be stored in a file with a unique extension (e.g. *.st). In another embodiment, the seed trie may store newly discovered data (e.g. URLs discovered via a crawler crawling web pages on the Internet, etc.). Thus, the seed trie 606 may store data which is unsorted according to common prefixes of such data. While only a single seed trie 606 is shown, it should be noted that the first computer 602 may also include a plurality of seed tries, in another embodiment. For example, each time a module (e.g. crawler) is finished discovering new data, the crawler may produce a new seed trie containing the newly discovered data.

The first computer 602 also includes a plurality of sorted seed tries 608A-C. The sorted seed tries 608A-C may also each be included in a file with a unique extension (e.g. *.sst). Additionally, the sorted seed tries 608A-C may store data which has been sorted from the seed trie according to common prefixes of such data. For example, each sorted seed trie 608A-C may store data with a single common prefix.

In one embodiment, a maintenance agent may process the data stored in the seed trie 606 by sorting (e.g. grouping, etc.) the data according to common prefixes, separating the data based on the sorting, and storing the sorted data in the sorted seed tries 608A-C based on common prefixes. Optionally, the sorting may include identifying a name of a target sorted seed trie 608A-C by extracting a registered domain name from a URL stored in the seed trie 606 and utilizing the first a letters (e.g. where n is predefined) as the name (or part of the name) of the target sorted seed trie 608A-C.

Each of the second computer 604A, third computer 604B, and fourth computer 604C also include a sorted seed trie 610A-C. In one embodiment, the maintenance agent of the first computer 602 may copy each of the sorted seed tries 608A-C to a remote computer as a separate file. Optionally, each of the sorted seed tries 608A-C of the first computer 602 may only be copied to one of the second computer 604A, third computer 604B, and fourth computer 604C if the name of such sorted seed trie 608A-C matches the names of tries already existing on the second computer 604A, third computer 604B, and/or fourth computer 604C. In this way, each of the second computer 604A, third computer 604B, and fourth computer 604C may store a different sorted seed tree 610A-C.

Furthermore, each of the second computer 604A, third computer 604B, and fourth computer 604C include a crawl tree 612A-C. The crawl trees 612A-C may also each be included in a file with a unique extension (e.g. *.ct). The crawl trees 612-C may be utilized for permanently storing data, as an option.

In one embodiment, the maintenance agent of each of the second computer 604A, third computer 604B, and fourth computer 604C may identify data stored in a respective sorted seed tree 610A-C and merge the data into an associated crawl tree 612A-C. The merging may include copying data from the sorted seed trie 610A-C to the associated crawl tree 612A-C. During the merge, the maintenance agent may also perform operations (e.g. based on user-configured constraints) such as splitting the crawl trie 612A-C into multiple crawl tries (e.g.

due to size limits of the crawl trie 612A-C), removal of data in the crawl trie 612A-C that is marked for deletion, etc.

The maintenance agent may delete data stored in the crawl trie 612A-C by reorganizing the structure of the crawl trie 612A-C. Data marked for deletion may be deleted in bulk during other maintenance operations, such as merging, for limiting a performance impact on the crawl trie 612A-C, as an option.

The crawl tries 612A-C may be utilized as input for crawlers. For example, each crawler may pull a set of URLs to be visited (e.g. according to defined crawling strategies) from one of the crawl tries 612A-C, may download an associated web page and may update such crawl trie 612A-C with metadata. The metadata may include, for example, a category of the web page, a main language used by the web page, etc.

Figure 7:
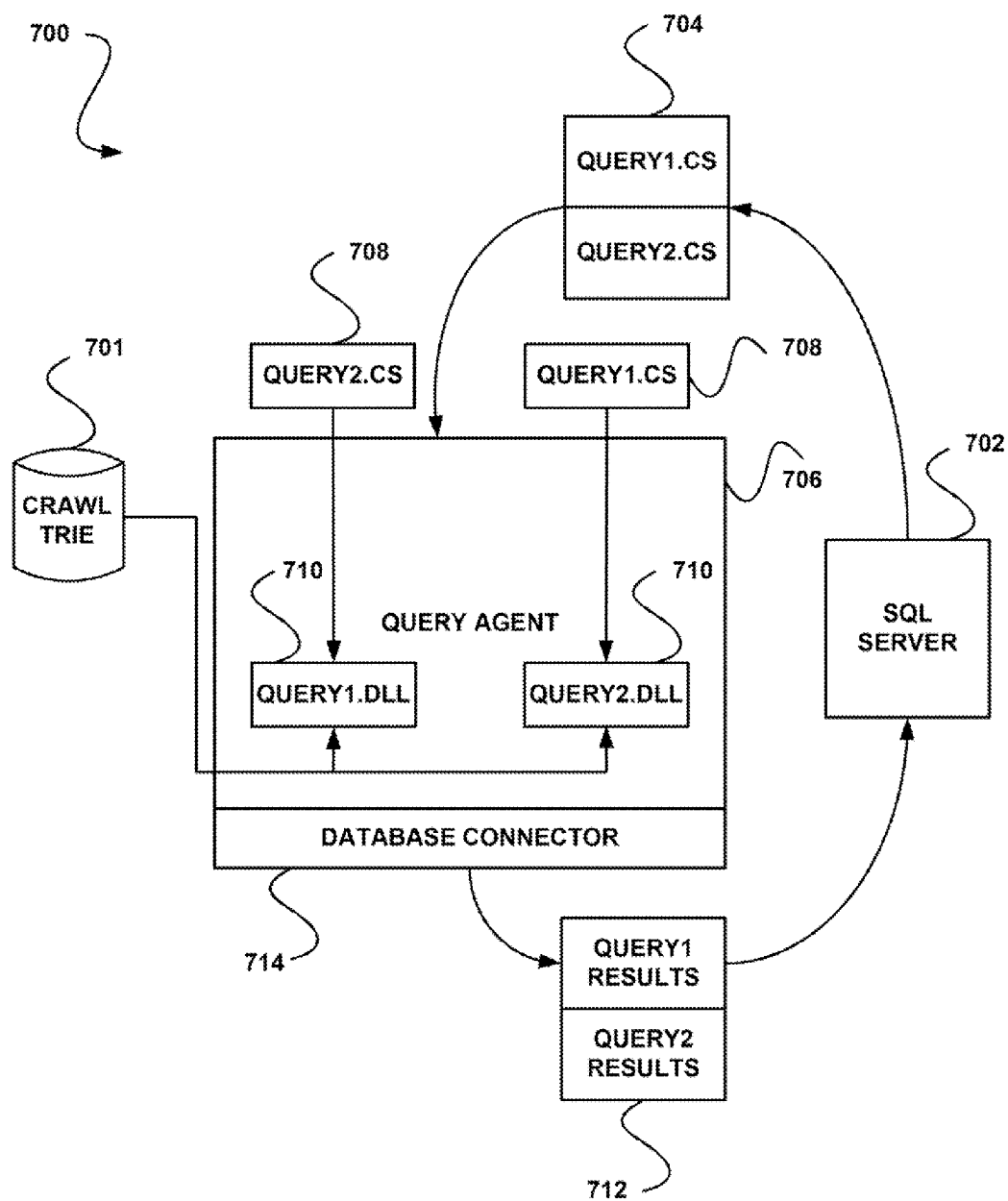
FIG. 7 shows a system for querying a plurality of distributed tries, in accordance with another embodiment.

FIG. 7 shows a system 700 for querying a plurality of distributed tries, in accordance with another embodiment. As an option, the system 700 may be implemented in the context of the architecture and environment of FIGS. 1-6. Of course, however, the system 700 may be implemented in any desired environment. Yet again, it should be noted that the aforementioned definitions may apply during the present description.

In some embodiments, tries may be queried for data stored in such tries. For example, when a central control facility (e.g. user interface) issues a plurality of query requests 704, source code 708 for each of the queries is sent to each processing node that stores a trie file 701. In one embodiment, a query agent 706 local to each processing node compiles and binds the source code 708 as dynamic link library (DLL) files 710 and iterates over data in the trie. Of course, this could result in any type of executable.

Multiple queries may optionally be processed with a single in-order run of a selected trie file 701. Information may be collected during the processing and returned in a normalized format (e.g. query results 712) to a central database server, such as the SQL server 702 shown, via a database connector 714. The information may be returned to the central database server for the purpose of collation and reporting, for example. To this end, the central database server may communicate results of the query to the initiator of the query (e.g. the user interface).

Figure 8:
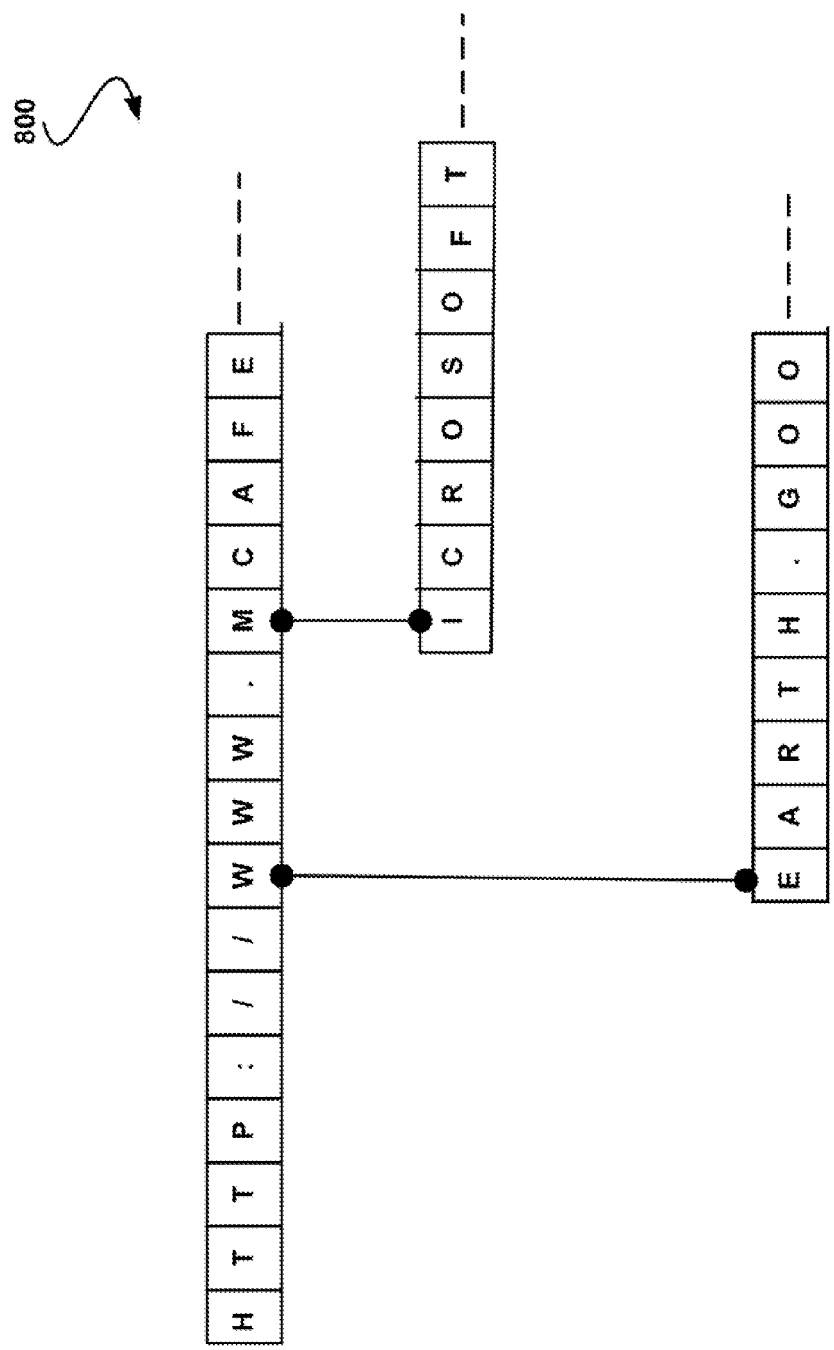
FIG. 8 shows uniform resource locators stored in a prefix tree, in accordance with yet another embodiment.

FIG. 8 shows uniform resource locators (URLs) 800 stored in a prefix tree, in accordance with yet another embodiment. As an option, the URLs 800 may be implemented in the context of the architecture and environment of FIGS. 1-7. Of course, however, the URLs 800 may be implemented in any desired environment. Yet again, it should be noted that the aforementioned definitions may apply during the present description.

As shown, the URLs 800 include arrays which are stored in the prefix tree. The prefix tree may include keys represented as strings, as an option. Each element of an array may be a node within the prefix tree. Thus, descendants of a node may share a common prefix with the node for minimizing storage space used by the prefix tree. Just by way of example, the URLs http://www.mcafe* and http://earth.goo* may share the common prefix "http://". Thus, the URL http://earth.goo* may be a descendant of http://www.mcafe* at the first "w" node within the URL http://www.mcafe*.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying a first file including a prefix tree, wherein the prefix tree includes an ordered hierarchical data structure which stores arrays of data with a common prefix, wherein the prefix tree stores at least a portion of uniform resource locators, each of the uniform resource locators having a common prefix;
    selecting an agent to process the first file; and
    processing the first file utilizing the agent, wherein the agent is selected based on a type of the prefix tree included in the first file, and wherein the type of the prefix tree is indicated by a file extension of the first file in which the prefix tree is included;
    wherein selecting the agent includes identifying that the prefix tree is a crawl trie based upon the file extension and selecting an agent configured to perform a crawling function based upon identifying that the prefix tree is a crawl trie; and
    wherein processing the first file utilizing the agent includes downloading a second file identified using a uniform resource locator stored in the prefix tree and analyzing the second file to identify unwanted content in the second file.

2. The method of claim 1, wherein the file is stored on a client computer.

3. The method of claim 2, wherein the agent is stored on the client computer.

4. The method of claim 1, wherein the agent includes a command line executable.

5. The method of claim 1, wherein the agent is selected from a pool of agents that perform different functions.

6. The method of claim 5, wherein each of the agents in the pool of agents performs at least one of a crawling function, a merging function, a separating function, and a reorganization function.

7. The method of claim 1, wherein a predefined number of the agents are capable of executing operations in parallel.

8. The method of claim 1, wherein the first file is further selected based on a time of a last access to the file.

9. The method of claim 1, wherein the agent is selected based on a determination of whether the agent is in an idle state.

10. The method of claim 1, wherein the processing includes analyzing the second file for gathering information associated with the uniform resource locator.

11. The method of claim 1, wherein the processing includes categorizing a target pointed to by a uniform resource locator stored in the prefix tree.

12. The method of claim 1, wherein a plurality of different files having a different prefix tree are distributed across a plurality of devices.

13. The method of claim 12, wherein the different files include different types of prefix trees.

14. The method of claim 1, wherein analyzing the second file to identify unwanted content in the second file includes analyzing the second file to identify malware in the second file.

15. A method, comprising:
    identifying a first file including a prefix tree, wherein the prefix tree includes an ordered hierarchical data structure which stores arrays of data with a common prefix, wherein the prefix tree stores at least a portion of uniform resource locators, each of the uniform resource locators having a common prefix;

selecting an agent to process the first file based on a type of the prefix tree included in the file, and wherein the type of the prefix tree is indicated by a file extension of the file in which the prefix tree is included, and wherein selecting the agent includes identifying that the prefix tree is a crawl trie based upon the file extension and selecting an agent configured to perform a crawling function based upon identifying that the prefix tree is a crawl trie; and processing the first file utilizing the agent, wherein identifying the file includes selecting the file from a queue of files, and wherein processing the file utilizing the agent includes downloading a second file identified using a uniform resource locator stored in the prefix tree and analyzing the second file for gathering information associated with the uniform resource locator.

16. A non-transitory computer readable storage medium for storing instructions for performing operations comprising:

identifying a first file including a prefix tree, wherein the prefix tree includes an ordered hierarchical data structure which stores arrays of data with a common prefix, wherein the prefix tree stores at least a portion of uniform resource locators, each of the uniform resource locators having a common prefix;

selecting an agent to process the first file based on a type of the prefix tree included in the file, and wherein the type of the prefix tree is indicated by a file extension of the file in which the prefix tree is included, and wherein selecting the agent includes identifying that the prefix tree is a crawl trie based upon the file extension and selecting an agent configured to perform a crawling function based upon identifying that the prefix tree is a crawl trie; and processing the first file utilizing the agent, wherein processing the file utilizing the agent includes downloading a second file identified using a uniform resource locator stored in the prefix tree and analyzing the second file for gathering information associated with the uniform resource locator.

17. The non-transitory computer readable storage medium of claim 16, wherein analyzing the second file includes analyzing the second file to identify unwanted content in the second file.

18. The non-transitory computer readable storage medium of claim 16, wherein the agent is further selected based on a determination of whether the agent is in an idle state.

19. The non-transitory computer readable storage medium of claim 16, wherein the agent is selected from a pool of agents that perform different functions.

20. The non-transitory computer readable storage medium of claim 16, wherein the first file is further selected based on a time of a last access to the file.

* * * * *